(12) United States Patent
Vaissiere

(10) Patent No.: US 11,293,796 B2
(45) Date of Patent: Apr. 5, 2022

(54) METHOD AND SYSTEM FOR DETECTING A FAULT CONDITION IN THE MEASUREMENT OF THE LEVEL OF A MEDIUM IN A TANK

(71) Applicant: Endress+Hauser Group Services AG, Reinach (CH)

(72) Inventor: Dimitri Vaissiere, Rixheim (FR)

(73) Assignee: Endress+Hauser Group Services AG, Reinach (DE)

( * ) Notice: Subject to any disclaimer, the term of this patent is extended or adjusted under 35 U.S.C. 154(b) by 0 days.

(21) Appl. No.: 17/251,131

(22) PCT Filed: May 23, 2019

(86) PCT No.: PCT/EP2019/063407
§ 371 (c)(1),
(2) Date: Dec. 10, 2020

(87) PCT Pub. No.: WO2019/238384
PCT Pub. Date: Dec. 19, 2019

(65) Prior Publication Data
US 2021/0131854 A1    May 6, 2021

(30) Foreign Application Priority Data

Jun. 14, 2018 (DE) ............... 10 2018 114 256.0

(51) Int. Cl.
*G01F 25/00* (2022.01)
*G01F 25/20* (2022.01)
(Continued)

(52) U.S. Cl.
CPC ............ *G01F 25/22* (2022.01); *G01F 23/284* (2013.01); *G01F 23/64* (2013.01); *G01F 23/80* (2022.01); *G01S 13/08* (2013.01)

(58) Field of Classification Search
None
See application file for complete search history.

(56) References Cited

U.S. PATENT DOCUMENTS 8,624,748 B1    1/2014  Grasty, Jr.
2014/0174172 A1*  6/2014  Hagg ............... G01F 23/284
                                              73/290 V
(Continued)

FOREIGN PATENT DOCUMENTS

EP         3059186 A1    8/2016
WO      2008010702 A1    1/2008
(Continued)

*Primary Examiner* — Paul M. West
*Assistant Examiner* — Mark A Shabman
(74) *Attorney, Agent, or Firm* — Mark A. Logan; Endress+Hauser (USA) Holding Inc.

(57) ABSTRACT

Disclosed is a method for detecting a fault condition in the measurement of the level of a medium in a tank having a floating roof. The method uses a radar level gauge to measure the level of the floating roof and a level measuring device to measure the level of the medium. The method includes recording the level of the floating roof during a defined time interval that comprises some filling/emptying cycles of the medium, recording the level of the medium during said time interval, determining the deviations between the level of the medium and the corresponding level of the floating roof, centering the deviations between the level of the medium and the level of the floating roof reduced by the thickness of the floating roof with the corresponding level data, and generating an alert message when the centered deviations exceed a tolerance threshold.

11 Claims, 4 Drawing Sheets

(51) Int. Cl.
*G01F 23/284* (2006.01)
*G01F 23/64* (2006.01)
*G01S 13/08* (2006.01)
*G01F 23/80* (2022.01)

(56) References Cited

U.S. PATENT DOCUMENTS

2016/0229627 A1  8/2016  Joosten et al.
2017/0302001 A1  10/2017 Serneby et al.

FOREIGN PATENT DOCUMENTS

WO   WO-2008010702 A1 *  1/2008  ........... G01F 23/284
WO      2014098696 A1     6/2014

* cited by examiner

H = L - D

METHOD AND SYSTEM FOR DETECTING A FAULT CONDITION IN THE MEASUREMENT OF THE LEVEL OF A MEDIUM IN A TANK

CROSS-REFERENCE TO RELATED APPLICATIONS

The present application is related to and claims the priority benefit of German Patent Application No. 10 2018 114 256.0, filed on Jun. 14, 2018 and International Patent Application No. PCT/EP2019/063407, filed on May 23, 2019, the entire contents of which are incorporated herein by reference.

TECHNICAL FIELD

The invention refers to method and a system for detecting a fault condition in the measurement of the level of a medium in a tank with a floating roof, whereby the floating roof is floating on the medium and is vertically guided in the tank. A radar level gauge and a level measuring device are provided. The radar level gauge which is mounted in a fixed position on the tank, is emitting radar signals in the direction of the floating roof and receiving the echo signals reflected on the surface of the floating roof. The radar level gauge determines the distance to the floating roof and the level of the floating roof or the medium in the tank, respectively. The level measuring device is directly measuring the level of the medium in the tank.

BACKGROUND

Regarding the inventive solution the level of the roof is preferably detected by using a radar level meter. The radar level meter emits radar signals, especially microwave or ultrasonic signals, to the surface of the roof and receives the echo signals reflected on the roof. The level of the roof is determined by the run-time of the radar signals. In particular, the radar level meter can be a pulse radar device or an FMCW radar device.

The level measuring device may be any device measuring the level of a medium in the tank continuously. Preferably a TDR (Time Domain Radar) measuring device is used. But it is also possible to use a capacitive or conductive measurement device. Generally spoken, any level measuring device which is measuring the level of a medium continuously and which can resist the harsh atmosphere of industrial processes may be used. A wide range of different types of level measurement devices for process automation is offered and sold by the Endress+Hauser Group.

The invention is used in the monitoring of large tanks. In large liquid tanks, particularly in fuel or oil tanks at refineries and the like, which can hold large amounts of oil products, use is frequently made of a floating roof which floats on the liquid in the tank and is therefore displaceable in a vertical direction. Thus, the floating roof can follow the level of a liquid (for example, an oil product), when the liquid is discharged from or filled into the tank. Floating roofs of this type are used for preventing leakage of vapors and gases from the tank into the atmosphere and ingress of e.g. rainwater from the surroundings into the liquid.

Typically, the prevention of leakage and ingress is enhanced by a sealing arrangement fitted along a perimeter of the floating roof for providing sealing and sliding contact with the inner wall of the tank. Further, using a roof that floats on the liquid enables minimizing a space between the liquid and the roof and thereby minimizing the amount of gases and liquid in vapor form in this space. In case of fuel and oil tanks, the environment on top of the floating roof is a hazardous or potentially hazardous environment. Floating roofs for these purposes are usually manufactured as large steel structures with float means, so-called pontoons. They can have a weight in the order of a hundred tons and a diameter of tens of meters. Regarding size and environmental aspects, it is important to monitor the normal operation by a monitoring system.

The purpose of such a monitoring system is to have control of the floating roof, i.e. to make sure that unwanted situations related to cases when the roof does not float properly on the product, i.e. liquid surface are detected. There are also advantages related to environmental requirements, e.g. to avoid evaporation of volatile hydrocarbons into the environment in case the roof gets flooded with product. Finally, the monitoring system may eliminate or at least reduce the need for inspection activities. Typically, the pontoons of a floating roof must be inspected for leakage in regular time intervals by a person that opens up the hatches in the pontoons. This type of work has certain personal risks and could be minimized with a fault condition detection system. The monitored distance between the surface of the floating roof and the medium surface is normally substantially constant. Due to external influence such as wind, rain or snow, minor deviations of a few cm are acceptable, but deviations exceeding a certain threshold (e.g. more than 5 cm in some applications) typically indicate a fault or an undesired condition. It would be desirable to provide diagnostics functionality for detecting fault conditions, so that such fault conditions may be addressed very early.

A floating roof tilt detection method is described in WO 2014/098696 A1. The known solution is able to identify an undesired condition in the function of a floating roof of a tank, said method comprising: a) determining a filling level of a product in said tank using a first level gauge emitting electromagnetic signals into said tank and receiving electromagnetic echo signals reflected by a surface of said product, b) detecting a reference distance between a reference position on said roof and said surface using a second level gauge mounted on said roof, c) forming a reference distance deviation as a difference between said reference distance and an expected value, d) comparing said reference distance deviation with a specified range, e) if said reference distance deviation is outside said specified range, storing a data set including said reference distance deviation and said filling level, f) repeating steps a) to e) for a plurality of points in time, g) based on stored data sets of reference distance deviations and filling levels, identifying said undesired condition. The steps a) to e) are performed during a plurality of filling-emptying cycles. Step g) comprises: establishing that deviations stored during consecutive filling-emptying cycles, and identifying said undesired condition as a problem in an interface between a tank wall and said roof.

WO 2014/098 696 A1 refers to a monitoring system for monitoring a floating roof of a floating roof tank containing a liquid and having a bottom, a cylindrical wall, a floating roof floating on said liquid. Said system is arranged to determine a local status of said floating roof in at least three spaced apart sensing element locations of said floating roof. One radar level gauge is fixed in each of the three spaced apart sensing element locations on the floating roof. A monitoring circuitry receives the indications of the local status from each of the radar level gauges and determines an overall monitored status of said floating roof based on at least one of said indications of said local status. The known system is quite cost-intensive, as at least three radar level gauges are needed for monitoring the position of the floating roof.

SUMMARY

It is an object of the invention to provide a reliable and simple method and system, respectively, for detecting a fault condition which may occur when measuring the level of a medium in a floating roof tank.

To this extent, the invention describes a method for detecting a fault condition in the measurement of the level of a medium in a tank with a floating roof, whereby the floating roof is floating on the medium and is vertically guided in the tank. A radar level gauge and a level measuring device are provided, whereby the radar level gauge, mounted in a fixed position on the tank, is emitting radar signals in the direction of the floating roof and receiving the echo signals reflected on the surface of the floating roof, and whereby the level measuring device is measuring the level of the medium in the tank. The inventive method comprises the steps of:

a) determining and recording data representing the level of the floating roof during a defined time interval, whereby the defined time interval comprises some filling/emptying cycles of the medium in/from the tank,
b) determining and recording data representing the level of the medium in the tank during said time interval, which comprises some filling/emptying cycles of the medium in/from the tank,
c) determining the deviations between the data representing the level of the medium in the tank and the corresponding data representing the level of the floating roof,
d) centering the deviations between the stored data representing the level of the medium and the level of the floating roof reduced by the thickness of the floating roof with the corresponding level data,
e) generating an alert message that a fault condition in the level measurement is detected if the centered deviations exceed a tolerance threshold in at least one height of the tank.

According to the invention Big Data analysis are used to detect a fault condition in a tank where a floating roof is floating on the medium.

The invention further comprises the step of setting different threshold values at different heights of the tank. This may prevent an alarm message, for example at low medium levels where no security-relevant fault condition may appear.

A refinement of the inventive method comprises the steps of:
forming the centered deviations between the stored data representing the level of the floating roof and the level of the medium,
and generating an alert message that at least one of the level meters is in a fault condition, in the case that the centered deviations are not stationary. A drift in the centered deviations is interpreted as a gradual deterioration in the measuring accuracy of the device. A further refinement of the invention comprises the step of providing the information that the radar level gauge or the level measuring device is in a fault condition. As a predictive maintenance task, the service staff can test the device and repair or replace it before failure.

Additionally, the inventive method allows to detect a fault condition in the guiding of the floating roof in the tank.

When the guiding of the floating roof in the tank is working correctly, the deviations of the level of the floating roof and the level of the medium in the tank show—to a statistical understanding—a stationary behavior, at least within a predetermined tolerance band.

Stationarity of a time series can be validated using the so called Augmented Dickey-Fuller test. According to George E. P. Box, G. M. J., Gregory C. Reinsel, Greta M. Ljung, *Time Series Analysis. Forecasting and control*. fifth ed. 2016: John Wiley & Sons a time series $z_t$ is said stationary as:

$$E[z_t] = \int_{-\infty}^{+\infty} z \cdot p(z) \cdot dz = \mu \neq f(t)$$

$$\text{Var}[z_t] = \int_{-\infty}^{+\infty} (z-\mu)^2 \cdot p(z) \cdot dz = \sigma_z^2 \neq f(t)$$

$$\text{Cov}[z_t, z_{t+k}] = E[(z_t - \mu)(z_{t+k} - \mu)] = \gamma_k = f(k) \neq f(t)$$

The width of the tolerance band is mainly given by the measurement accuracy of the radar level device and the level measuring device. Consider the following example: In the case that there is an obstacle on the inner surface of the tank at a height of 4 m, the floating roof may be tilted if this height is reached during the filling and emptying cycles. The same is true if a vertical guiding system is used for guiding the roof. Then the tilting of the roof indicates that there is a malfunction of the vertical guiding system at a height of 4 m.

Because of the tilted roof the difference of the deviations of the two measuring devices exceed the predetermined tolerance range, always when the roof passes the height of 4 m. To detect this fault condition in the guiding of the floating roof, a refinement of the invention proposes the steps of: analyzing the centered deviations as a function of the height of the tank by using an outlier detection method and generating an alert message that a fault condition of the vertical guiding of the floating roof occurs, in the case that the centered deviations exceed repeatedly the threshold value/threshold values in at least one height of the tank. In Big Data analyses, especially in data mining, anomaly detection and especially outlier detection is the identification of items, events or observations, for example measurement values, which do not conform to an expected pattern or other items in a dataset. Typically the anomalous items or the outliers are referred to some kind of problem.

Further refinements of the invention are the steps of: providing the information at which height/heights of the tank the fault condition/fault conditions of the vertical guiding occurs/occur, and checking if the vertical guiding for the floating roof in the tank is defect at the height/heights where the fault condition/conditions has/have occurred.

Alternatively, it is proposed that the threshold value/threshold values is/are adapted depending on the height where the tilting of the floating roof in the tank occurs. The following example may illustrate this proposal: If the tank is, for example, 20 m high, and the tilting of the floating roof occurs at 4 meters, it is not critical to increase the threshold value in such a way that the alarm message is not generated if the adapted threshold value is not exceeded. If the tilting of the tank occurs regularly at 16 m height, repair measures must be taken, as there is the risk that the tank overflows. This overflow of the tank must be prevented for safety reasons.

It is a refinement of the inventive method that a message and a clear instruction, respectively are provided to the service staff how to adapt the threshold values at the different heights of the tank to avoid future alert messages, but to ensure safety.

As previously mentioned, the invention also refers to a system for detecting at least one fault condition in the measurement of the level of a medium in a tank whereby a floating roof, guided vertically in the tank is floating on the medium, comprising a radar level gauge, a level measuring device and corresponding computing electronics, whereby the radar level gauge, mounted in a fixed position on the tank is emitting radar signals in the direction of the floating roof and receiving the echo signals reflected on the surface of the floating roof, whereby the level measuring device is designed to measure the level of the medium in the tank, and whereby the computing electronics is designed to conduct the steps of the inventive method, as it is described before in different embodiments. The computing electronics may be included in an edge device or it may be part of a server or server platform in the Cloud.

Preferably an edge device is provided, positioned not so far away from the tank, whereby the edge device has a first data interface for communication with the radar level gauge and the level meter (via Bluetooth, NFC, Wireless HART, etc.), and a second data interface for communication with a server or a server platform in the Cloud, preferably via an internet protocol. The edge device makes the data accessible to the service staff, but it is also a data storing and linking device between the radar level gauge and a server or a server platform in the cloud. It is collecting and/or processing data of the level gauge and the level measuring device over time, and transmits the time-stamped data from time to time via a secure communication line to the server/server platform in the cloud or to the service staff.

BRIEF DESCRIPTION OF THE DRAWINGS

The invention and further advantages of the invention are explained in more detail in the figures.

DETAILED DESCRIPTION

Figure 1:
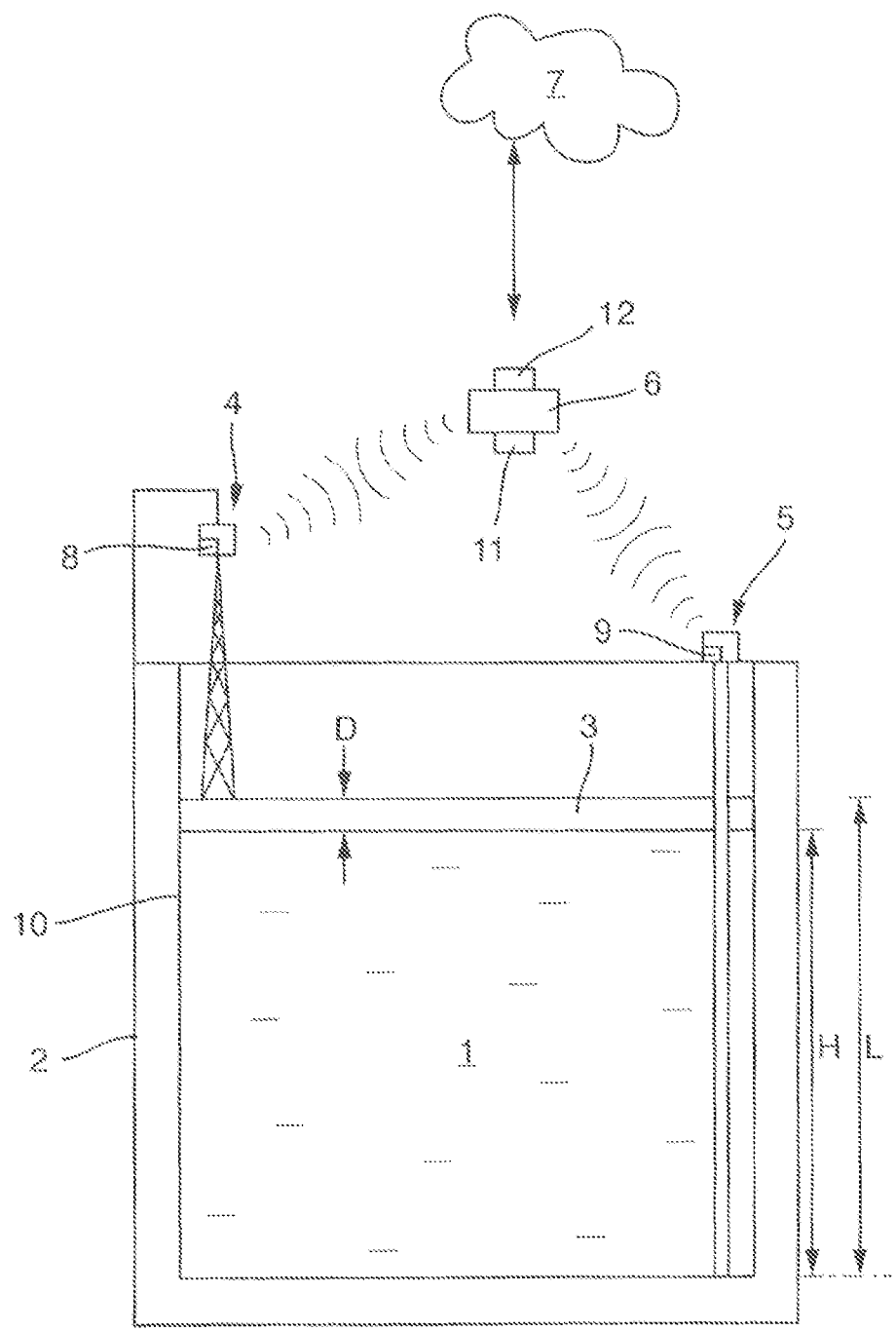
FIG. 1 shows a sketch of a system for detecting a fault condition of floating roof tank in process automation.

FIG. 1 shows a sketch of a system for detecting a fault condition of a floating roof tank 2. A flowable medium 1 is stored in the tank 2. The tank has a floating roof 3 floating on the surface of the medium 1. A radar level gauge 4 is mounted in a fixed position on the tank 2. It emits radar signals (ultrasonic or microwave signals) and receives the radar signals reflected on the surface of the floating roof 3. A computation electronics 8, having at least one microprocessor, is preferably embedded in the housing of the radar level gauge 4. The computation electronics 8 determines the level of the floating roof 3 in the tank 2 by evaluating the measured run-time of the radar signals.

The level of the medium 1 is determined by the level measuring device 5. The level measuring device 5 can be, for example, a TDR- (Time Domain Reflectometry) device, a conductive probe, or a capacitive probe which continuously determine the level of the medium 1 in the tank. Again, a computation electronics 9 is provided for determining the level of the medium 1 in the tank 2. Preferably, it is embedded in the housing of the level measuring device 5. Usually the computation electronic 8, 9 is integrated in the housings of the corresponding sensors. But the computation electronic 8, 9 can also be integrated in the edge device 6 or it may be part of the cloud server.

Radar level gauges 4 are well-known. They are offered and sold, in different embodiments designed to be used in different applications, by Endress+Hauser under the names PROSONIC and MICROPILOT, for example. TDR measurement devices for the continuous measurement of the level of a medium in a tank are well-known and offered and sold under the name Levelflex.

The edge device 6 is the linking device between the inside sphere of the process owner—here the owner of the tank or a tank farm with a lot of floating roof tanks—and the outside sphere, i.e. the internet and the cloud 7, respectively. The edge device 6 is collecting time-stamped measuring data of the radar level gauge 4, computing and/or transferring them to an inside sphere server platform or to a remote server in the cloud 7. The edge device 6 is remotely located from the radar level gauge 4 and the measuring device 5, and has a first data interface 11 for communication with the radar level gauge 4 and the measuring device 5, and a second data interface 12 for communication with the server or the server platform. The communication between the radar level gauge 4—and maybe other field devices mounted in or on the tank 2 or in or another tanks 2 of the tank farm—and the edge device 6 is normally based on the HART protocol or another protocol (Profibus, Fieldbus Foundation, . . . ) used in process automation applications. But the data may also be transferred by standard NFC protocols, like Bluetooth and so on. The communication between the edge device 6 and the server platform/server in the cloud 7 is preferably based on a standard Internet protocol. The communication can be wire-bound or wireless. As already mentioned the server platform in the cloud 7 may also be used for Big Data historical analysis of the data provided by the radar level gauge 4 and the level measuring device 5 and maybe other sensors or actuators, i.e. field devices. The server platform or the server in the cloud 7 can be used to receive information or warnings/alerts from the edge device 6 and trigger service operations provided by a service supplier.

Figure 2:
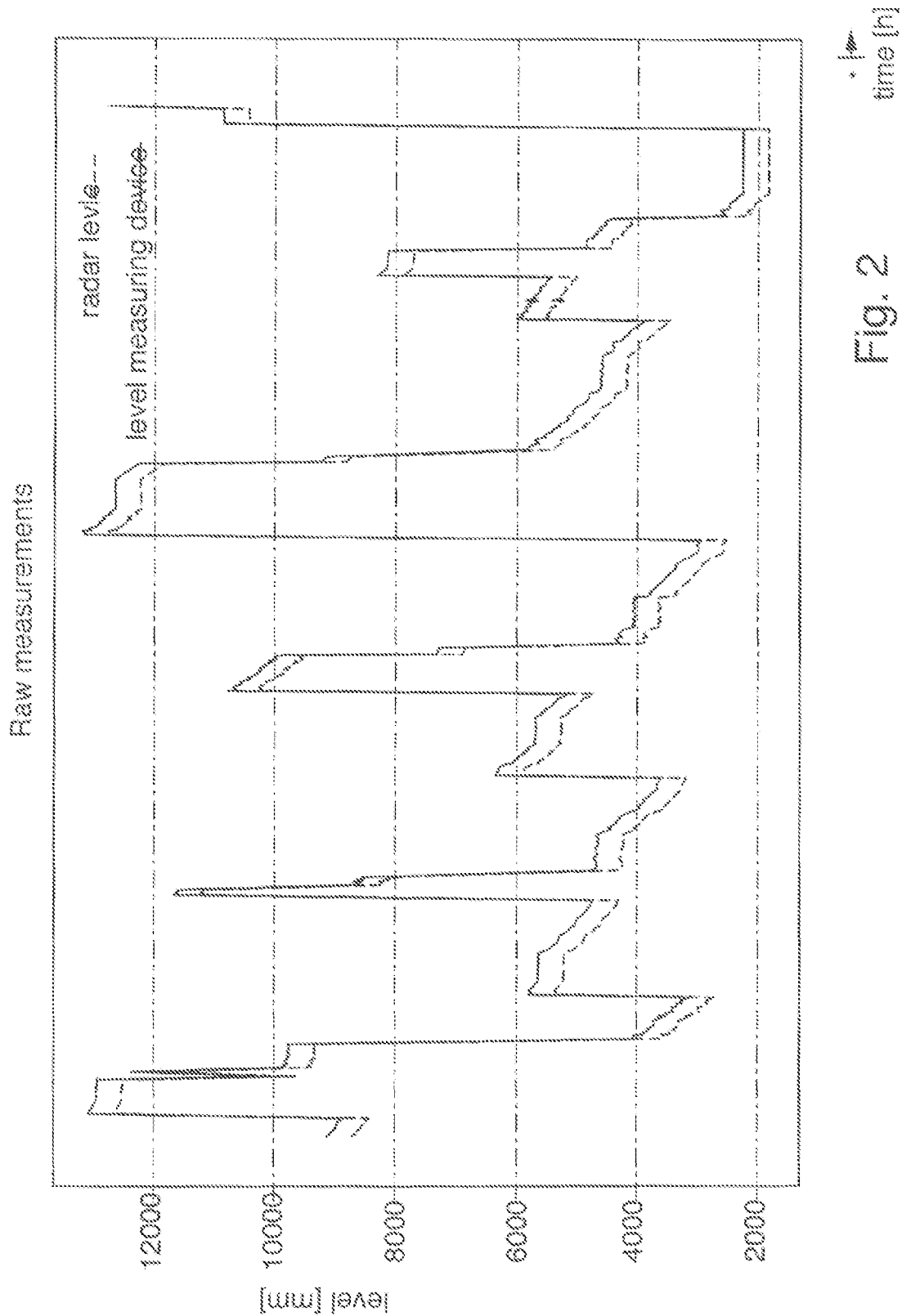
FIG. 2 shows the graph of the level of the floating roof measured by a radar level device over time, and the graph of the level of the medium measured by the level measuring device over time.

In more detail and according to one preferred embodiment of the invention the inventive system is performing the following steps:

The radar level device 4 is continuously determining data representing the level of the floating roof 3 in the tank 2 during a defined time interval. During said time interval, the level measuring device 5 is determining data representing the level of the medium 1 in the tank 2. The time interval is chosen so that it comprises at least some filling/emptying cycles of the medium 1 in/from the tank 2. The measured data are stored, preferably in the edge device 6 or in the server/on the server platform in the cloud 7. FIG. 2 shows the graph of the level (filling height) of the floating roof 3 measured by the radar level device 4 during a defined time interval (red or dotted line), and the graph of the level of the medium 1 measured by the level measuring device 5 during the same time interval (blue or solid line). Within the measurement accuracy the difference of the two data sets corresponds to the thickness of the floating roof 3.

Based on the measured data the edge device 6 or the server/the server platform determines the deviations between the data representing the level of the medium 1 in the tank 2 and the corresponding data representing the level of the floating roof 3.

Then, the deviations between the stored data representing the level of the medium 1 and the level of the floating roof 3 are centered. Preferably the measuring data concerning the height of the floating roof 3 are reduced by the thickness D of the floating roof 3. The centered deviations of the data representing the level of the medium 1 in the tank 2 are plotted against the height of the medium 1 in the tank 2. If the centered deviations exceed a tolerance threshold in at least one height of the tank, an alert message may be generated that a fault condition in the level measurement has been detected.

Figure 4:
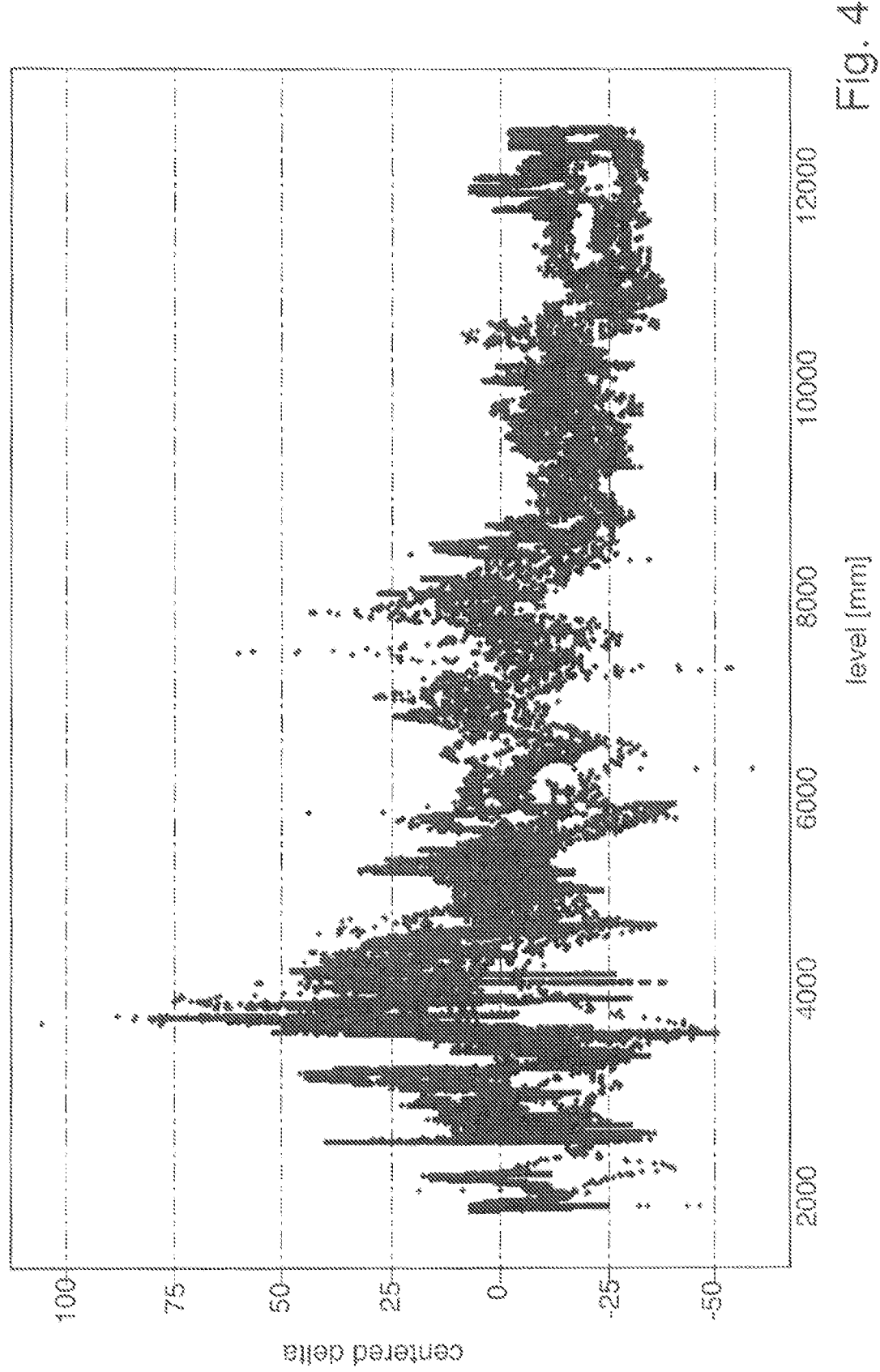
FIG. 4 shows a graph of the centered deviations between the data representing the level of the floating roof and the level of the medium, plotted against the height of the tank.

FIG. 4 shows a graph of the centered deviations between the data representing the level of the floating roof 3 and the level of the medium 1 that are plotted against the height of the tank. The centered deviations as a function of the height of the tank 2 are analyzed in the edge device 6 or the server or the server platform by using an outlier detection method. An alert message that a fault condition of the vertical guiding 10 of the floating roof 3 occurs, in the case that the centered deviations exceed repeatedly the threshold value/threshold values in at least one height of the tank 2. Depending on the threshold value, a fault condition of the guiding occurs in FIG. 4 at a height of 4 m. Having this precise information concerning the vertical guiding 10 or the inner surface of the tank 2, the service staff can check and repair the guiding.

Figure 3:
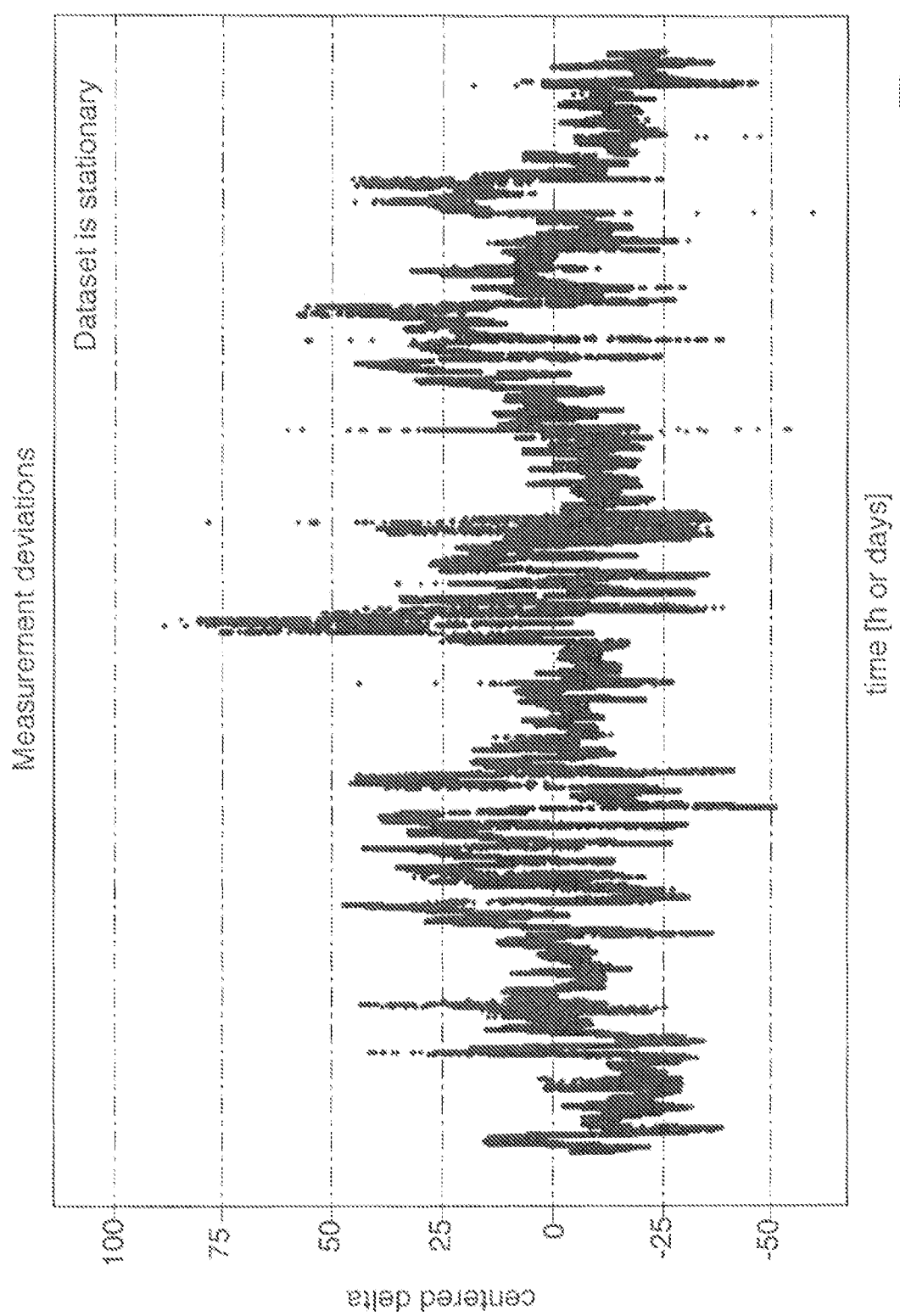
FIG. 3 shows the centered time-dependent deviations between the data representing the level of the floating roof and the level of the medium.

According to an interesting embodiment, the invention can also be used for predictive maintenance information of the radar level gauge and the level measuring device. For this purpose, the centered deviations between the stored data representing the level of the floating roof 3 and the level of the medium 1 are formed. An alert message that at least one of the level meters 4, 5 is in a critical condition, if generated, if the centered deviations are not stationary. In FIG. 3 the centered deviations of the data representing the level of the floating roof 3 and the level of the medium 1, plotted against the time. In the shown case the centered deviations are stationary within the predetermined tolerance. Therefore, the data do not provide any hint that one of the devices 4, 5 is facing a failure.

The invention claimed is:

1. A method for detecting a fault condition in the measurement of a level of a medium in a tank having a floating roof floating on the medium and vertically guided in the tank, the method comprising:
   providing a radar level gauge mounted in a fixed position on the tank, wherein the radar level gauge is configured to emit radar signals in the direction of the floating roof and to receive echo signals reflected from a surface of the floating roof;
   providing a level measuring device configured to measure the level of the medium in the tank;
   determining and recording data representing a level of the floating roof during a defined time interval, wherein the defined time interval includes at least two filling and emptying cycles of the medium in the tank;
   determining and recording data representing the level of the medium in the tank during said time interval;
   determining deviations between the data representing the level of the medium in the tank and the corresponding data representing the level of the floating roof;
   centering the deviations between the stored data representing the level of the medium and the level of the floating roof;
   analyzing the centered deviations as a function of the height of the tank by using an outlier detection method;
   generating an alert message that a fault condition in the level measurement is detected when the centered deviations exceed a tolerance threshold in at least one height of the tank; and
   generating an alert message that a fault condition of the vertical guiding of the floating roof occurs when the centered deviations exceed repeatedly the tolerance threshold value in at least one height of the tank.

2. The method according to claim 1, further comprising: setting different threshold values at different heights of the tank.

3. The method according to claim 1, further comprising:
   forming the centered deviations between the stored data representing the level of the floating roof and the level of the medium; and
   generating an alert message when the centered deviations are not stationary, wherein the alert message indicates that the radar level gauge or the level measuring device is facing a fault condition.

4. The method according to claim 3, further comprising: providing the information that the radar level gauge or the level measuring device is facing a fault condition.

5. The method according to claim 1, further comprising: providing the information at which height of the tank the fault condition of the vertical guiding occurs.

6. The method according to claim 5, further comprising: checking if the vertical guiding for the floating roof in the tank is defect at the height/heights where the fault condition/conditions has/have occurred.

7. The method according to claim 1, further comprising: adapting the threshold value depending on the current conditions in the tank.

8. The method according to claim 1, further comprising: providing a message to service staff how to adapt the threshold values at the different heights of the tank to avoid future alert messages.

9. A system for detecting at least one fault condition in the measurement of the level of a medium in a tank having a floating roof guided vertically in the tank and floating on the medium, the system comprising:
   a radar level gauge mounted in a fixed position on the tank and configured to emit radar signals in the direction of the floating roof and to receive echo signals reflected on a surface of the floating roof;
   a level measuring device configured to measure a level of the medium in the tank; and
   a computing electronics configured to:
      determine and record data representing a level of the floating roof during a defined time interval, wherein the defined time interval includes at least two filling and emptying cycles of the medium in the tank;
      determine and record data representing the level of the medium in the tank during said time interval;
      determine deviations between the data representing the level of the medium in the tank and the corresponding data representing the level of the floating roof;
      center the deviations between the stored data representing the level of the medium and the level of the floating roof;

analyze the centered deviations as a function of the height of the tank by using an outlier detection method;

generate an alert message that a fault condition in the level measurement is detected when the centered deviations exceed a tolerance threshold in at least one height of the tank; and generate an alert message that a fault condition of the vertical guiding of the floating roof occurs when the centered deviations exceed repeatedly the tolerance threshold value in at least one height of the tank.

10. The system according to claim 9, further comprising:
an edge device including a first data interface for communication with the radar level gauge and the level measuring device, and a second data interface for communication with a server via an internet protocol.

11. System according to claim 9,
wherein the computing electronics for evaluating the measuring data is in the Cloud.

* * * * *